United States Patent
Dowdal et al.

(10) Patent No.: US 7,924,704 B2
(45) Date of Patent: *Apr. 12, 2011

(54) MEMORY OPTIMIZATION PACKET LOSS CONCEALMENT IN A VOICE OVER PACKET NETWORK

(75) Inventors: John T. Dowdal, Germantown, MD (US); Sachin Adlakha, Germantown, MD (US); Dunling Li, Rockville, MD (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/537,715

(22) Filed: Aug. 24, 2009

(65) Prior Publication Data

US 2009/0310603 A1    Dec. 17, 2009

Related U.S. Application Data

(62) Division of application No. 11/057,638, filed on Feb. 14, 2005, now Pat. No. 7,590,047.

(51) Int. Cl.
*H04L 12/26* (2006.01)

(52) U.S. Cl. ......... 370/216; 714/701; 714/746; 714/785

(58) Field of Classification Search .......... 370/216–228, 370/362–354, 356, 412, 413, 415, 417, 493–495; 714/701, 746–758
See application file for complete search history.

(56) References Cited

U.S. PATENT DOCUMENTS

| | | | |
|---|---|---|---|
| 6,434,606 B1 * | 8/2002 | Borella et al. | 709/214 |
| 6,952,668 B1 * | 10/2005 | Kapilow | 704/206 |
| 6,967,946 B1 * | 11/2005 | Tackin et al. | 370/352 |
| 7,359,409 B2 * | 4/2008 | Li | 370/516 |
| 7,359,979 B2 * | 4/2008 | Gentle et al. | 709/231 |
| 2004/0184443 A1 * | 9/2004 | Lee et al. | 370/352 |
| 2005/0058145 A1 * | 3/2005 | Florencio et al. | 370/412 |
| 2005/0166124 A1 * | 7/2005 | Tsuchinaga et al. | 714/776 |

* cited by examiner

*Primary Examiner* — Ayaz R Sheikh
*Assistant Examiner* — Mounir Moutaouakil
(74) *Attorney, Agent, or Firm* — Steven A. Shaw; W. James Brady; Frederick J. Telecky, Jr.

(57) ABSTRACT

A method to reduce memory requirements for a packet loss concealment algorithm in the event of packet loss in a receiver of pulse code modulated voice signals. A voice playout unit in the receiver shares its nominal delay buffer with a history buffer of a packet loss concealment algorithm up to a maximum limit described in a standard. This reduces or eliminates need to allocate memory for the history buffer. A history buffer can also be extended to retain an original portion of voice signal packets received prior to a packet loss as well as generated voice signals as they are generated. A scratch buffer is used as a working buffer and replaces the function of a pitch buffer.

11 Claims, 3 Drawing Sheets

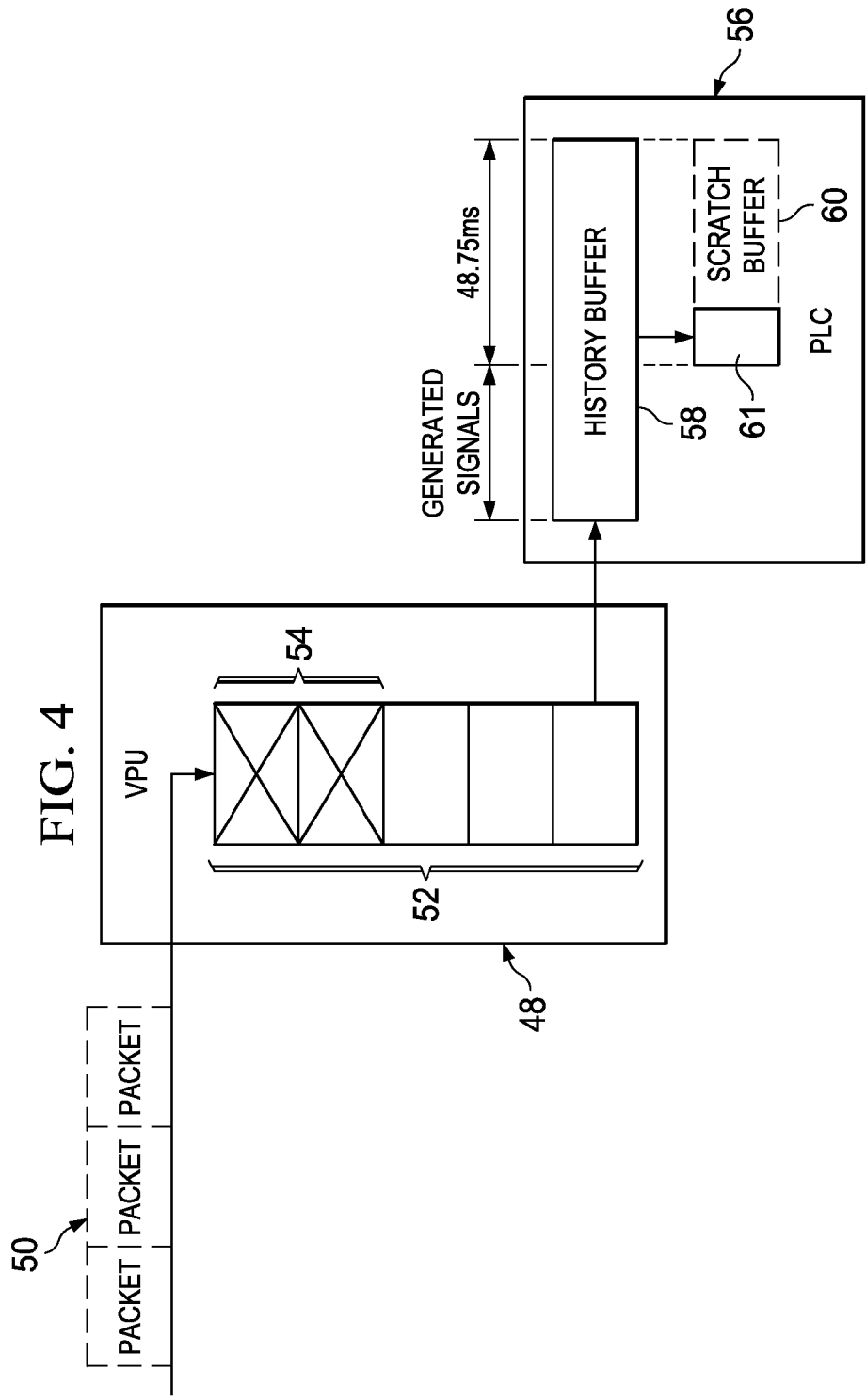

US 7,924,704 B2

MEMORY OPTIMIZATION PACKET LOSS CONCEALMENT IN A VOICE OVER PACKET NETWORK

CROSS-REFERENCE TO RELATED APPLICATIONS

This application is a Divisional of and claims priority under 35 U.S.C. §120 to U.S. application Ser. No. 11/057,638, filed on Feb. 14, 2005. Said application incorporated herein by reference.

BACKGROUND

Embodiments of the invention relate generally to reducing memory requirements for the generation of a synthetic speech signal for packet loss concealment in a voice over packet network.

In a packet-switched network, a packet of data often traverses several network nodes as it goes across the network in "hops." Each packet has a header that contains destination address information for the entire packet. Since each packet contains a destination address, they may travel independent of one another and occasionally become delayed or misdirected from the primary data stream. If delayed, the packets may arrive out of order. The packets are not only merely delayed relative to the source, but also have delay jitter. Delay jitter is variability in packet delay, or variation in timing of packets relative to each other due to buffering within nodes in the same routing path, and differing delays and/or numbers of hops in different routing paths. Packets may even be actually lost and never reach their destination.

Voice over Packet (VOP) and Voice over Internet Protocol (VOIP) are sensitive to delay jitter to an extent qualitatively more important than for text data files for example. Delay jitter produces interruptions, clicks, pops, hisses and blurring of the sound and/or images as perceived by the user, unless the delay jitter problem can be ameliorated or obviated. Packets that are not literally lost, but are substantially delayed when received, may have to be discarded at the destination nonetheless because they have lost their usefulness at the receiving end. Thus, packets that are discarded, as well as those that are literally lost, are all called "lost packets."

The user can rarely tolerate as much as half a second (500 milliseconds) of delay. For real-time communication some solution to the problem of packet loss is imperative, and the packet loss problem is exacerbated in heavily-loaded packet networks. Also, even a lightly-loaded packet network with a packet loss ration of 0.1% perhaps, still requires some mechanism to deal with the circumstances of lost packets.

Due to packet loss in a packet-switched network employing speech encoders and decoders, a speech decoder may either fail to receive a frame or receive a frame having a significant number of missing bits. In either case, the speech decoder is presented with the same essential problem—the need to synthesize speech despite the loss of compressed speech information. Both "frame erasure" and "packet loss" concern a communication channel or network problem that causes the loss of the transmitted bits.

Packet loss concealment (PLC) (also called frame loss concealment) algorithms hide losses that occur in packet networks by reconstructing the signal from the characteristics of the past signal. These algorithms reduce the click and pops and other artifacts that occur when a network experiences packet loss. PLC improves the overall voice quality in unreliable networks.

One standard recommendation to address this problem is the International Telecommunication Union (ITU) G.711 Appendix I recommendation for a packet loss concealment algorithm (G.711), which is used together with the G.711 codec. Referring to the block flow diagram in FIG. 1, G.711 describes a receiver 10 that maintains two data buffers that are used by a PLC module 18, history buffer 16 and pitch buffer 20. A data stream 12 is normally processed through the voice playout unit 14 in a receiver 10. If there are no lost packets in packet stream 12, then the voice playout unit (VPU) 14 sends its output data stream to voice decoder 15, which decodes the voice payload from each received packet 12. After the decoder 15, decoded voice data is sent through a switch 19 to and through various processes that are understood in the art to produce an audio output at audio port 22. Whether or not there is packet loss, the VPU 14 output is also saved into history buffer 16 on an ongoing basis. The history buffer 16 has a length of 48.75 ms worth of voice data samples. This length is equivalent to 390 samples for a 8 KHz sample rate. The history buffer 16 is constantly updated from samples from the VPU 14.

Pitch buffer 20 is the same length as the history buffer 16 and is used as a working buffer during a period of packet loss. Pitch buffer 20 is updated from the history buffer 16 at the occurrence of the first packet loss and is maintained for a period of consecutive losses. During the packet loss, the PLC algorithm generates a synthesized signal from the last received pitch period with no attenuation into the pitch buffer 20, which can then be added to the decoded stream from 15 through switch 19 or other device for playout at audio port 20. The history buffer is updated through each loss with the synthesized output as the erasure progresses.

The G.711 PLC algorithm adds a 3.75 ms delay, which is equivalent to 30 samples at 8 KHz. This delay is used for an Overlap Add (OLA) at the start of an erasure and at the end of the erasure. This allows the algorithm to perform smooth transitions between real and synthetic generated speech, and vice-versa. The synthesized speech from the pitch buffer is continued beyond the end of the erasure and then the generated speech is mixed with the real speech using OLA. The delay is to provide a smooth transition from a good frame to the first reconstructed frame. This avoids clicks in the audio caused by discontinuity between the good frames and the reconstructed frames, output that is unpleasant to the listener.

However, use of the pitch 20 and history 16 buffers and the OLA all require allocations of significant memory resources, even if the buffers are idle. These allocations are in addition to the memory allocation given to a receiver's voice playout unit 14. Packet losses in a stable network usually occur less in less than one percent of all data transmissions. Thus, the PLC is typically idle while continuing to require full memory allocations for its operations. What is needed is a technique to reduce memory requirements for packet loss concealment algorithms by reducing the buffer and OLA memory allocations.

SUMMARY

In a packet loss concealment algorithm, such as the G.711 Appendix I recommendation, the algorithm needs to store only up to a certain number of voice samples worth of data in a history buffer. The number of packets stored in a history buffer are proportional to the amount stored in the voice playout unit's First In First Out (FIFO) data buffer. In other words, the more samples stored in the FIFO data buffer, the less are stored in the history buffer, and vice-versa. In the event of a packet loss, the present invention uses the data packets stored in the FIFO data buffer of the VPU prior to playout instead of using a copy of these same samples in the history buffer. The history buffer may store a reduced amount of packets or none at all, thereby reducing or eliminated the need for allocated memory for a history buffer.

In an alternative embodiment, a history buffer that is used by the PLC algorithm in the event of a packet loss is extended to include more than a standard length of samples (e.g., 48.75 ms of samples in G.711 Appendix I) for the period of packet loss. Regenerated samples are added to an extended history buffer. In the event of a consecutive packet loss, the original samples in the history buffer are copied to a scratch buffer that is used to regenerate the lost packet. A scratch buffer is a buffer that lasts for only a single frame, whereas a static buffer lasts for longer than a single frame. The original history buffer samples are retained in the extended history buffer as the original set of voice data packets. As new samples are regenerated to replace the lost packets, the new samples are added to the extended history buffer without losing any of the original sample set in the buffer.

BRIEF DESCRIPTION OF THE DRAWINGS

For a better understanding of the nature of the present invention, its features and advantages, the subsequent detailed description is presented in connection with accompanying drawings in which:

FIG. 4 is a block diagram of the alternative embodiment of using a static pitch buffer and extended history buffer for a packet loss concealment algorithm.

DETAILED DESCRIPTION

In an exemplary embodiment, the memory requirements are reduced for an International Telecommunication Union (ITU) G.711 Appendix I Packet loss concealment (PLC) algorithm. The optimizations result from a look ahead that can be performed by virtue of the voice playout buffer that exists in all Voice Over Internet Protocol (VOIP) software. The basic method of the preferred embodiment of the present invention is illustrated in the flowchart in FIG. 3.

As stated in the background of this present application, the pitch buffer of the G.711 PLC standards contains packets that are copied from the history buffer upon notice by the PLC algorithm that a packet loss has occurred. When a first loss of packets occurs in the data stream received into the receiver containing a voice playout unit (VPU), the PLC copies the history buffer into the pitch buffer. For the duration of the packet loss (which could be one, two, or more consecutive packets), the pitch buffer is used as a working buffer and is not a circular queue. Using the speech indicators from speech prior to the lost packet, the PLC algorithm generates a synthetic speech signal and inserts this synthetic signal into the proper location of the data stream.

Figure 1:
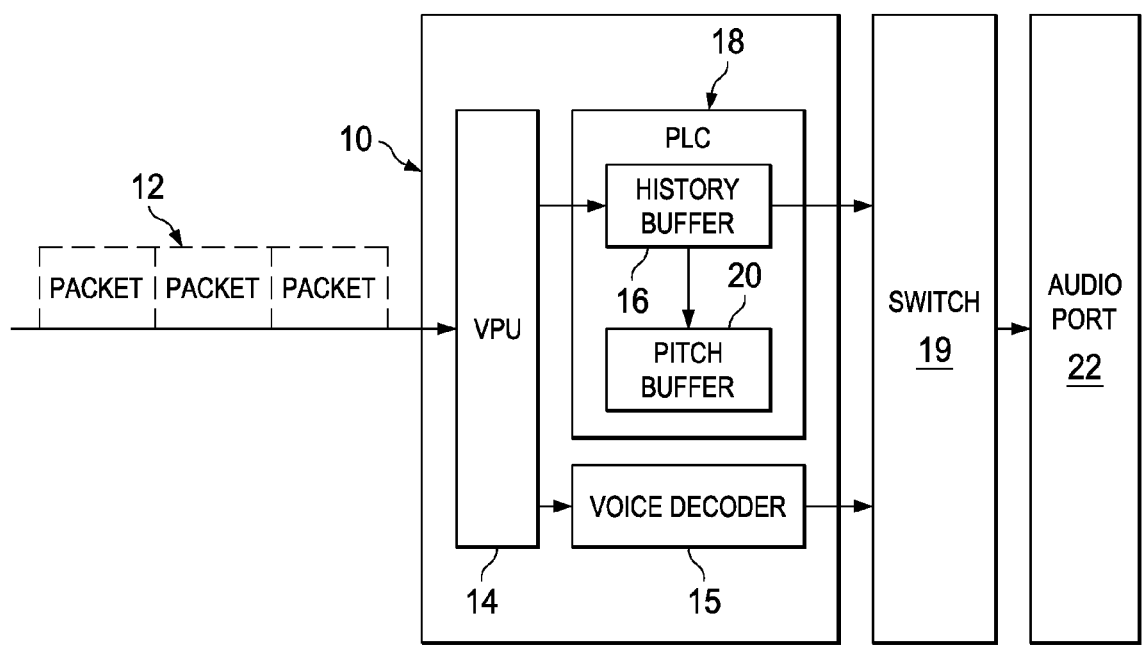
FIG. 1 is an illustration a receiver with a voice playout unit and buffers used by a packet loss concealment algorithm.
Figure 2:
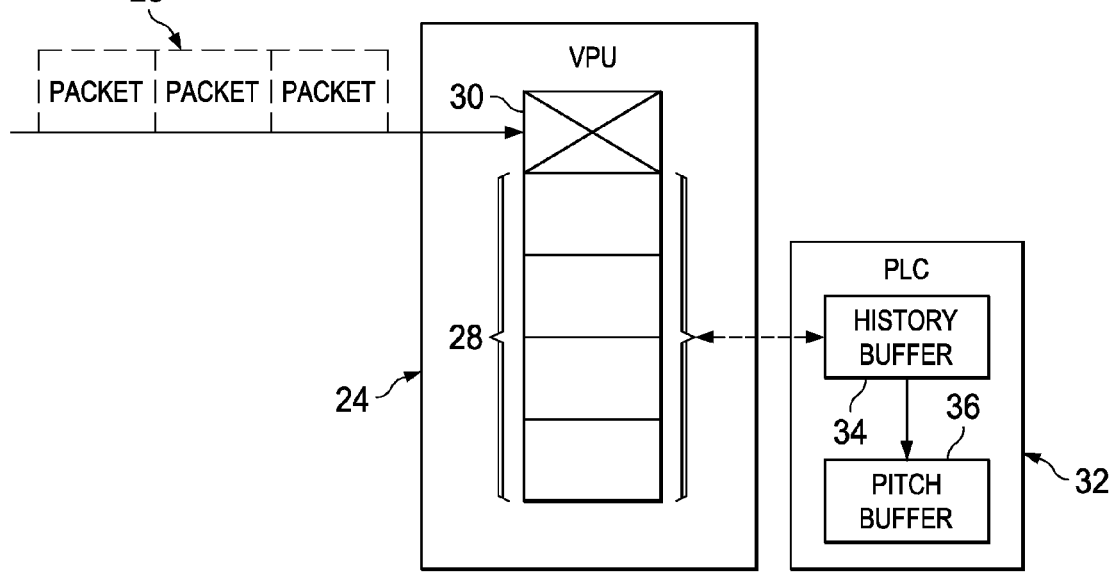
FIG. 2 is an block diagram of the preferred embodiment of using the VPU nominal delay buffer as a PLC history buffer.
Figure 3:
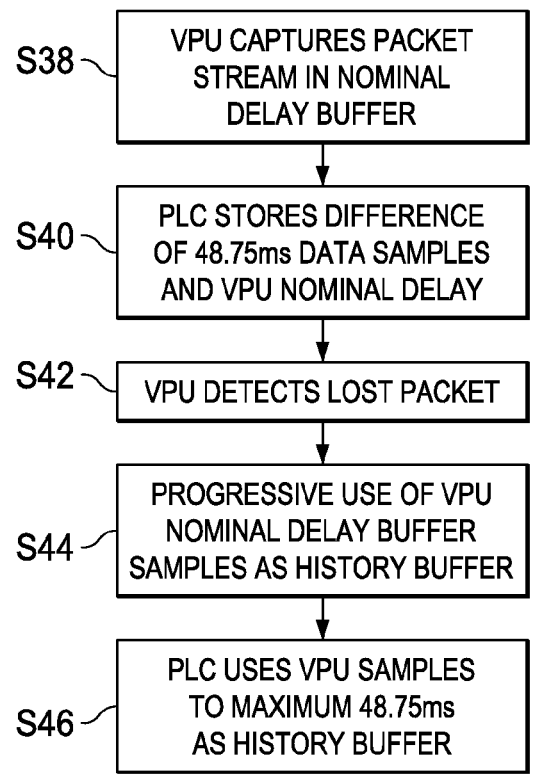
FIG. 3 is a flowchart of the preferred embodiment using the VPU buffer as a PLC history buffer.

Referring to FIGS. 2 and 3, the preferred embodiment of the present invention uses a VPU 24 to capture S38 the incoming packets 26 from a data stream and store the packets into a buffer 28. VPU 24 compensates for delay and jitter that are inherent in packet networks. VPU 24 is aware of the sequence of packets that must by played out to an audio telephony outlet, such as audio port 22 in FIG. 1. VPU buffer 28 is a FIFO (First In First Out) buffer that adds a configurable amount of delay that normally depends on network characteristics.

Because of the inherent delay added by VPU 24 to the system, the VPU is aware of the status of incoming packets at some time period in the future, prior to playout. The preferred embodiment uses this knowledge of prior packet status to reduce memory requirements for history buffer 34 of PLC 32.

In the present invention, the combined buffers within VPU and PLC always contain a complete history buffer. In the example of a PLC using G.711 Appendix I standards, this complete history buffer is 48.75 ms. The dynamic variation occurs with the amount of data samples stored by each buffer depending upon the nominal delay configuration as well as whether a packet that is expected has failed to arrive at the VPU. Since packets in a packet network may arrive late and out of order, packets are not declared "lost" until the missing packet has failed to arrive after a certain time period. Waiting too long for the lost packet to arrive could result in unacceptable playout delay. If the packet arrives late but the PLC algorithm has not yet been activated, then the lost packet may get placed into a slot in the VPU buffer according to the packet's sequence number and a PLC algorithm is not necessary. If the assumed lost packet 30 arrives late, the PLC can release any extra data samples accumulated for its operations and revert back to storing only the remaining portion of the total history buffer, which in the example is 18.75 ms of data samples. However, if the delayed packet arrives after the PLC algorithm is activated, then the packet is declared lost and the operations of the present invention to generate a synthesized packet may apply.

Nominal delay is the length of delay in VPU buffer 28. Depending upon the nominal delay, the PLC is aware of the status of incoming packets from a current play out time up to the equivalent future time for nominal delay. Thus, all incoming packets 26 are captured by VPU 24 up to nominal delay in the VPU. In the event of a lost packet 30, the preferred embodiment uses the VPU buffer 28 of data packets in front of the lost packet 30 as either part of the history buffer or as all of the history buffer up to 48.75 ms of data samples. As an example, if nominal delay of VPU buffer 28 is configured less than 48.75 ms, then history buffer 34 needs to store only the difference in samples between 48.75 ms and the nominal delay period S40. The reduced storage of samples in the history buffer according to the preferred embodiment performs equivalent to the prior art recommendation in G.711 because the next erasure would not occur until nominal delay time units from the current time. The look ahead capability in the VPU 24 provides for a dynamic memory allocation for the history buffer 34, depending upon the current status of the network.

In an example of the preferred embodiment using G.711 Appendix I, if the nominal delay for VPU 24 is 30 ms, then the PLC 32 effectively requires storage of only 18.75 ms worth of samples in history buffer 34. The combined buffers provide for the total 48.75 ms of data samples should a future packet loss occur.

In the case of a lost packet 30, VPU detects that packet 30 in incoming packet stream 26 is actually a lost packet S42. As a result of the lost packet 30, a discontinuity in VPU buffer 28 occurs. In order to effectively conceal lost packet 30 with a generated packet, PLC 32 would require 48.75 ms of history samples under the G.711 standard. As VPU 24 sends packets out of buffer 28 for playout, PLC 32 knows of the impending missing packet 30. The VPU 24 detects a loss or potential loss in the packet stream and communicates to PLC 32 to begin saving packets that have already arrive prior to the lost packet. When the PLC algorithm is ready to generate a synthetic voice packet that conceals the lost packet 30, PLC 32 uses the 18.75 ms of samples from history buffer 34 combined with the 30 ms in VPU buffer 28 resulting in the full 48.75 ms of sample history required by the standard. The 30 ms of captured data in VPU buffer 28 is transferred on to PLC 32 as time progresses without duplication of the data samples.

In an additional example of the dynamic sharing of VPU buffered data, if the nominal delay is configured to 50 ms then history buffer needs no memory allocation for storage of packets. If packet 30 is lost, the VPU notifies PLC immediately that the lost packet occurred. This notification is 50 ms prior to the last received packet in buffer 28 being transferred into history buffer 34 of PLC 32. All 50 ms of the packetized samples in VPU buffer 28 ahead of lost packet 30 are available for use by PLC to fill the 48.75 ms history buffer requirement. In this case, the system gains the entire 48.75 ms that was formerly allocated for use by the history buffer 34. Further, if VPU has a greater memory allocation than is used by the nominal delay, the history buffer can use the difference in the allocated verses actual memory used by VPU, resulting in a zero loss of memory in the system.

A case may occur during the reception of voice signals into a receiver containing a VPU that the loss of signals continues beyond a single packet. After a first packet loss, the system begins generating silence instead of synthesized voice signals. In this case, the contents of the history buffer are released, and the system waits until real voice signals are received again. The real voice packets received after the period of silence are then maintained in the history buffer in the normal course of operations. Thus, the sharing of the delay buffer 28 between the VPU and PLC reduces the effective memory requirement for PLC, since the VPU will buffer voice samples regardless of PLC operations.

Figure 5:
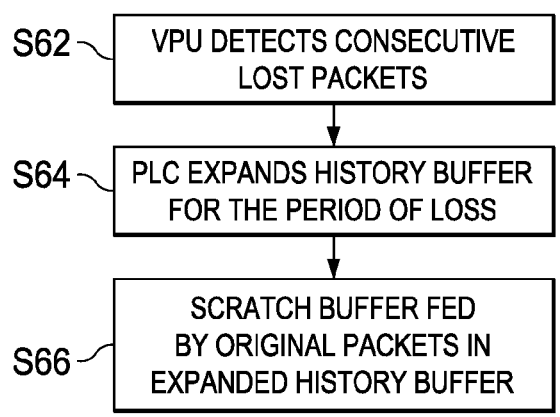
FIG. 5 is a flowchart of the alternative embodiment.

Referring to FIGS. 4 and 5, an alternative exemplary embodiment of the present invention uses a voice playout unit (VPU) 48 that exists in voice over packet (VOP) software to capture the incoming packets 50 from a data stream and store the packets into a buffer 52. VPU 48 compensates for delay and jitter that are inherent in packet networks. VPU 48 is aware of the sequence of packets that must by played out to an audio telephony outlet, such as audio port 22 in FIG. 1. VPU buffer 52 is a FIFO (First In First Out) buffer that adds a configurable amount of delay that normally depends on network characteristics. Nominal delay is the length of delay in VPU buffer 52. Thus, all incoming packets 50 are captured by VPU 48 up to nominal delay in the VPU.

The alternative embodiment uses the fact that only the last quarter of the samples in the conventional pitch buffer 20 is actually changed between consecutive losses in order to reduce the pitch buffer memory requirement. The conventional pitch buffer 20 is replaced S66 with a scratch buffer 60 and fed with samples from extended history buffer 58. These samples are used by the alternative embodiment to overwrite regenerated samples in order to correctly simulate the effect of the scratch pitch buffer 60. After the generation of a speech signal in a first lost packet, the PLC needs to generate a second speech signal to replace the speech in the subsequent consecutive lost packet. Since the history buffer is constantly changing as synthetically generated speech samples are appended to the buffer, the history buffer 58 is extended beyond the conventional length of 48.75 ms of samples for the period of loss. Thus, for every lost packet, the size of the history buffer 58 is preferably increased S64 for the period of packet loss, correspondingly larger for each regenerated packet size, in order to regenerate the conventional pitch buffer 60.

The extended history buffer contains the entire set of samples received in the history buffer prior to the period of packet loss. Since the history buffer is extended beyond the conventional 48.75 ms, the original 48.75 ms of real speech samples that were received prior to a packet loss are retained within the history buffer 58 during the entire period of packet loss. The alternative method uses a small portion 61 of a traditional pitch buffer combined with a scratch buffer 60 to form a working buffer that is used in the regeneration of voice samples in the event of packet loss. The scratch buffer only exists for a single frame and then releases its memory allocation. An exemplary static pitch portion is one-quarter of the maximum pitch period for the incoming voice stream. The static pitch buffer portion is then extended with a scratch buffer to function as the working buffer for voice signal reconstruction.

The alternative embodiment uses the original samples retained in the extended history buffer 60 the remainder of voice samples needed by the PLC to generate synthesized voice signals to replace those that were lost. Thus, the alternative embodiment eliminates the need to duplicate voice data packets that are saved in a history buffer 16 to a pitch buffer 20. This, in turn, saves memory resources in a processor by retaining only a single set of the voice samples needed to generate a synthesized voice sample during periods of consecutive packet losses.

In G.711, the PLC algorithm provides for pitch corresponding to frequencies of 200 Hz to 66 Hz, which correspond to taps from 5 ms to 15 ms. Thus, the maximum variation in pitch buffer would occur for a tap of 15 ms. Since one a quarter of that tap is actually changing when the PLC is generating speech to replace lost packets, it is equivalent to thirty samples, sampled at 8 kHz. Therefore only thirty samples of static pitch buffer 36 are required for storage in order to effectively regenerate the conventional pitch buffer 60 from the history buffer 58.

A specific example of the alternative embodiment is compared to a prior art pitch buffer of 390 samples in length. The G.711 PLC algorithm requires 48.75 ms worth of samples in the pitch buffer to generate a synthesized voice sample. According to G.711, the maximum change to the pitch buffer is ¼ of the maximum pitch, which is 30 samples. The alternative embodiment keeps a portion 61 of a static pitch buffer that is ¼ of the maximum pitch, which are then modified as the tail of the generated sample is smoothed by the PLC algorithm. Any remaining samples needed by the PLC algorithm as a working buffer for creating a synthesized sample to replace the lost sample are copied from the history buffer 58 to the scratch buffer 60.

One skilled in the art will appreciate that the present invention can be practiced by other than the described embodiments, which are presented for purposes of illustration and not limitation, and the present invention is limited only by the claims that follow.

What is claimed is:
1. A method for packet loss concealment, comprising:
   receiving voice data signals into a voice playout unit;
   detecting, in the voice playout unit, a lost voice data signal during said receiving;
   buffering, in the voice playout unit, said voice data signals;
   saving, in a history buffer in a packet loss concealment unit, said voice data signals which arrived in the packet loss concealment unit prior to the lost voice data signal but are not yet played out, only when the voice playout unit detects the lost voice signal; and using, in the packet loss concealment unit, said buffered voice data signals of the voice playout unit instead of at least part of the history buffer of the packet loss concealment unit as a sample history to generate synthesized voice data signals when packet loss concealment unit is ready to replace the lost voice data signal.

2. The method of claim 1, wherein said using comprises sharing said buffered voice data signals with the history buffer of said packet loss concealment unit to a combined maximum of said voice data signals required for generation of a synthesized voice data signal to replace said lost voice data signal.

3. A method claim 2, further comprising:
reducing a memory allocation for said history buffer by a corresponding memory allocation used by said buffered voice data signals.

4. The method of claim 1, wherein said sharing comprises storing a portion of said received voice data signals in said history buffer, wherein said portion is a size difference between said required voice data signals and said buffered voice data signals.

5. The method of claim 1, wherein said packet loss concealment unit includes an International Telecommunications Union G.711 Appendix I packet loss concealment algorithm configured to use the buffered voice data signals instead of at least a part of the history as the sample history.

6. The method of claim 1, the history buffer being configured to store only the difference between 48.75 ms of samples and a nominal delay period of the voice playout unit.

7. A processor that is programmed to:
receive voice data signals in to a voice playout unit;
detect, in said voice playout unit, a lost voice data signal during said receive;
buffer said voice data signals in said voice playout unit;
save, in a history buffer in a packet loss concealment unit, said voice data signals which arrived in the packet loss concealment unit prior to the lost voice data signal but are not yet played out, only when the voice playout unit detects the lost voice data signal: and
use, in the packet loss concealment unit, said buffered voice data signals instead of at least part of the history buffer of the packet loss concealment unit as a sample history to generate synthesized voice data signals when packet loss concealment unit is ready to replace the lost voice data signal.

8. The processor of claim 7, wherein said use comprises sharing said buffered voice data signals with the history buffer of said packet loss concealment unit up to a combined maximum of said voice data signals required for generation of a synthesized voice data signal lo replace said lost voice data signal.

9. The processor claim 8, wherein said sharing comprises storing portion of said received voice data signals in said history buffer, wherein said portion is a size difference between said required voice data signals and said buffered voice data signals.

10. The processor of claim 7, wherein said packet loss concealment unit includes an international Telecommunications Union G.711 Appendix I packet loss concealment algorithm configured to use the buffered voice data signals instead of at least a part of the history buffer as the sample history.

11. The processor of claim 7, the history buffer being configured to store only the difference between 48.75 ms of samples and a nominal delay period of the voice playout unit.

* * * * *